United States Patent [19]
Scerbo

[11] 3,868,859
[45] Mar. 4, 1975

[54] POSITIVE DRIVE VIBRATORY MECHANISM
[75] Inventor: Louis Joseph Scerbo, Randolph Township, Morris County, N.J.
[73] Assignee: Bell Telephone Laboratories, Incorporated, Murray Hill, N.J.
[22] Filed: July 16, 1973
[21] Appl. No.: 379,584

[52] U.S. Cl. ................................... 74/61
[51] Int. Cl. ............................. F16h 33/00
[58] Field of Search ..................... 74/61; 308/35

[56] References Cited
UNITED STATES PATENTS

| | | | |
|---|---|---|---|
| 1,922,355 | 8/1933 | Byerlein | 308/35 |
| 2,094,251 | 9/1937 | Young | 308/35 |
| 2,947,183 | 8/1960 | Carrier, Jr. et al. | 74/61 |
| 3,486,387 | 12/1969 | Bray, Jr. | 74/61 |
| 3,659,467 | 5/1972 | Serrell | 74/61 |
| 3,760,694 | 9/1973 | Lieb | 308/35 |

FOREIGN PATENTS OR APPLICATIONS

| | | | |
|---|---|---|---|
| 1,079,421 | 10/1954 | Germany | 308/35 |
| 464,649 | 8/1928 | Germany | 308/35 |

Primary Examiner—Samuel Scott
Assistant Examiner—Wesley S. Ratliff, Jr.
Attorney, Agent, or Firm—A. D. Hooper

[57] ABSTRACT

A vibration generator comprises a housing having a cylindrical bearing surface around the inner surface thereof forming two tracks separated by an upstanding flange. A pair of rollers are joined by a common axle and adapted to travel around the tracks. A drive arm connects the axle to a drive shaft. The arm is connected to the shaft by a slot arrangement which requires the arm to rotate with the shaft but transmits no axial or thrust loads from the rollers to the shaft. The upstanding flange counters any thrust loads on the axle. Thus the rollers can be driven around the tracks by rotation of the drive shaft to produce a vibratory motion of the housing without any thrust loads being transmitted to the drive shaft. Accordingly, the provision of adequate bearings is greatly simplified.

2 Claims, 2 Drawing Figures

POSITIVE DRIVE VIBRATORY MECHANISM

BACKGROUND OF THE INVENTION

1. Field of the Invention

This invention relates to vibration generators and more particularly to a vibratory mechanism of the type attached to a piece of equipment such as a plow to enhance the operation thereof by the introduction of vibratory motion thereto.

2. Description of the Prior Art

It has been determined that the efficiency of many types of tools and equipments improves markedly if the tool is vibrated as it performs the work. For example, it is known that the drawbar force required for drawing a cable burying plow through the soil is substantially reduced if the plowshare is vibrated during the plowing operation. Vibration generators have also found numerous applications in the movement of material. Accordingly, much effort has been devoted to the development of such generators.

Most presently known generators produce vibrations by the high angular velocity operation of a rolling element such as a ball or cylindrical roller within a circular casing or an eccentric mass rigidly fixed to a drive shaft and supporting bearings. It is known to drive the rolling element about the casing by such means as a fluid jet of air, by a flexible geared drive shaft, and by a rigid drive arm structure. However, all of the existing vibration generators have certain disadvantages. Those generators utilizing balls as the rolling element whether they be the eccentric or part of the supporting bearing, are unable to transmit high vibration forces because of the essentially point contact between the ball and the casing which results in high contact forces. Generators utilizing fluid jets as the propelling force are not as precisely controllable as generators utilizing positive drive means such as rigid drive arms extending from a drive shaft. However, the presently known positive drive vibration generators are excessively complex because of the use of gearing and because of the requirement for heavy duty bearing arrangements to accommodate the radial and thrust loads transmitted to the drive shaft from the rolling element or eccentric mass. Thus a need remains for a simple, positive drive vibration generator which is capable of transmitting high vibration forces to the body to be vibrated without transmitting high radial and thrust loads back to the power source.

Accordingly, it is an object of the invention to improve vibration generator apparatus.

Another object is to provide a simplified positive drive vibration generator.

SUMMARY OF THE INVENTION

The foregoing objects and others are achieved in accordance with this invention by a vibration mechanism comprising a casing having a bearing surface therein forming at least one pair of circular raceways. A pair of rollers adapted for traveling about respective ones of the raceways is mounted within the casing and joined by an axle. A drive arm is connected on one end to the axle by a bearing to permit rotation of the axle with respect to the arm. The arm is also connected to a power or drive shaft by a slot arrangement which requires the arm to rotate with the power shaft but which permits free longitudinal and transverse movement of the arm with respect to the power shaft. An upstanding annular flange or thrust shoulder separates the two raceways to counteract the thrust loads from the rollers. Accordingly, the rollers can be driven about the raceway at high speeds to generate high vibration forces without the transmission of any significant thrust load to the power shaft. Thus the bearings required by the power shaft are relatively simple.

BRIEF DESCRIPTION OF THE DRAWING

The invention will be more fully comprehended from the following detailed description and accompanying drawing in which.

DETAILED DESCRIPTION

Figure 1:
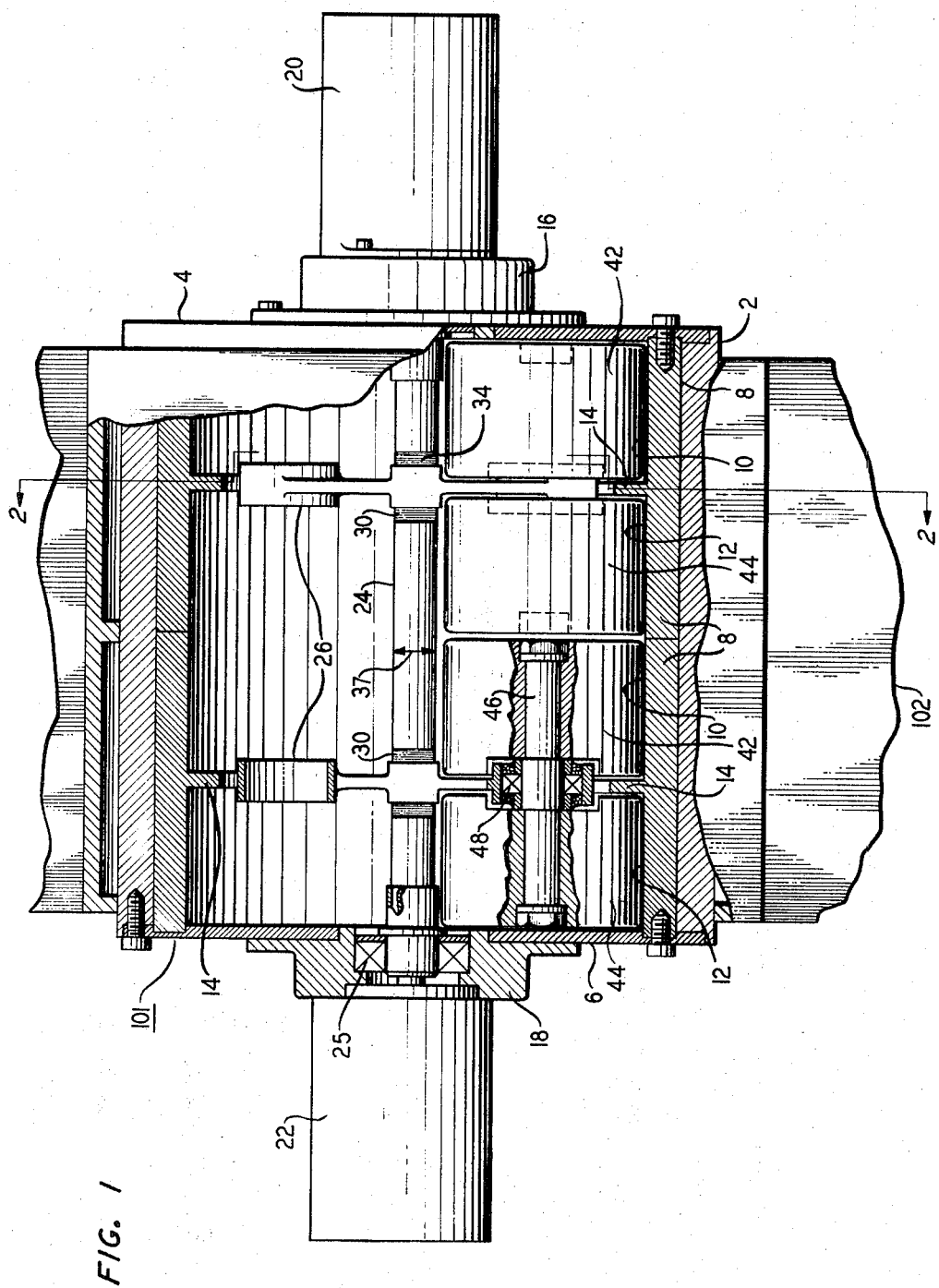
FIG. 1 is a partly sectional elevation view of a vibratory mechanism in accordance with this invention.

Referring now to FIG. 1, there is shown a partly sectional elevation view of a vibration generator 101 in accordance with this invention which can be mounted to a structure 102, such as plow apparatus to provide a vibrational motion thereto. Generator 101 includes a substantially cylindrical hollow housing or casing 2 to which structure 102 can be fastened. Housing 2 includes end plates or covers 4 and 6 over the ends thereof.

Around the inner surface of housing 2 are mounted bearing races 8, each having two tracks 10 and 12 separated by an upstanding annular flange 14. Races 8 can be made of well-known materials such as a hardened steel able to withstand the contact stresses to be encountered in operation.

Because of the high speeds and resulting high forces required of many vibration generators, it is desirable that such generators be made as symmetrical as possible to avoid unbalanced forces which add to the problem of providing adequate bearings. Accordingly, two bearing races 8 each having two tracks or raceways 10 and 12 are shown. However, any desired number could be utilized.

Mounted to covers 4 and 6, respectively, by mounts or flanges 16 and 18 are motors 20 and 22, respectively, which can comprise commercially available motors. A drive or power shaft 24 extends centrally through bearing races 8 between motors 20 and 22, and is supported in flanges 16 and 18 by appropriate bearings 25 known in the art.

Figure 2:
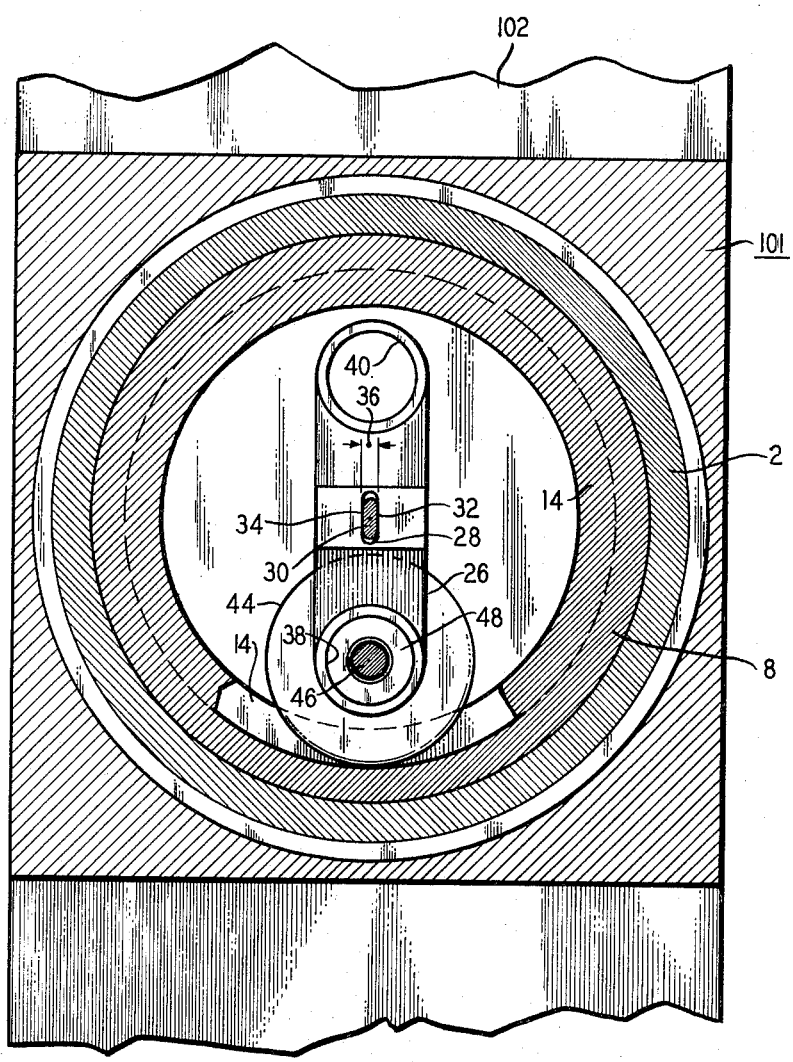
FIG. 2 is a view along direction 2—2 of FIG. 1.

At spaced points along drive shaft 24 coinciding with upstanding flanges 14 are located drive arms 26, which advantageously are symmetrical and counterbalanced about shaft 24 for the reasons previously mentioned. Drive arms 26 are coupled to drive shaft 24 by a slot arrangement, shown in more detail in FIG. 2, which permits free movement of arm 26 along and transverse to drive shaft 24 but which requires arm 26 to rotate with shaft 24. For example, arm 26 can have a central elongated slot 28 therein. Shaft 24 can have a portion 30 which has flattened parallel sides 32 and 34 separated by a distance slightly smaller than the width 36 of slot 24, while the diameter 37 of shaft 24 is greater than width 36. Accordingly, arm 26 can move transverse to and slide along shaft 24 but must rotate therewith. On the respective ends of arm 26 are openings 38 and 40 adapted to receive a bearing therein as will be subsequently discussed.

Located on either side of upstanding flanges 14 and adapted to roll about respective tracks 10 and 12 are cylindrical, high mass rollers 42 and 44. Rollers 42 and 44 are rigidly connected by a central shaft or axle 46. Drive arm 26 is connected to axle 46 centrally between rollers 42 and 44 by a bearing arrangement 48 which permits relative rotation of arm 26 with respect to axle 46.

When motors 20 and 22 rotate drive shaft 24, arm 26 is forced to rotate therewith driving rollers 42 and 44 about respective tracks 10 and 12. This motion of rollers 42 and 44 produces a high magnitude rotating force vector on tracks 10 and 12 which is transmitted to housing 2 and thence to the structure 102 to be vibrated. Rollers 42 and 44 have a line contact with tracks 10 and 12, and thus the contact stresses produced in tracks 10 and 12 by the high forces are substantially less than the stresses which would be produced by point contact rotating bodies such as balls.

Driving rollers 42 and 44 from a central point therebetween reduces the tendency for the rollers to cock or move out of proper position or alignment with respect to the respective tracks 10 and 12. Any axial thrust forces along axle 46 produced by misalignment or otherwise are opposed by flange 14 which acts as a thrust shoulder. Thus no radial or axial thrust forces need be transmitted by arm 26 to shaft 24 and the slotted coupling arrangement previously discussed can be utilized. The provision of adequate bearings 25 for shaft 24 is made substantially easier where no axial or thrust loads are involved but only small rotational or radial loads as herein. If desired a coating of a suitable dry lubricant such as molybdenum disulfide can be applied to the opposing faces of flange 14 to reduce the generation of heat from the rubbing of rollers 42 and 44 thereagainst.

Rollers 42 and 44 must have outer diameters less than one-half the inner diameter of race 8 if a central, straight through drive shaft 24 is to be utilized. Larger rollers can be used with a suitable crankshaft. The forces produced during one rotation of shaft 24, i.e., one vibration cycle, are proportional to the mass of rollers 42 and 44. Thus, the forces can be increased by using dense material for the rollers.

It should be apparent from the foregoing that the vibration generator of this invention is substantially simpler than existing positive drive vibration generators. The use of a symmetrical, balanced configuration and the use of thrust shoulder or flange 14 to counter any axial thrust reduces the number of bearings required and the bearings actually used are not subject to stringent design requirements because of the relatively low loads thereon.

While the invention has been described with reference to a specific embodiment thereof, it is to be understood that various modifications thereto might be made without departing from its spirit and scope. For example, the number of drive arm-roller combinations can be varied. Only one motor can be utilized. A single roller having two rim portions joined by a necked-down center portion to serve as an axle could be utilized in lieu of rollers 42 and 44.

Arm 26 could be rigidly connected to shaft 24 by welding and to axle 46 by the discussed slot arrangement. Where the elongated slot is located at axle 46, axle 46 would have a portion similar to portion 30 discussed for shaft 24, and bearings would be included in rollers 42 and 44 for allowing rotation of axle 46 therein.

What is claimed is:

1. A vibrating mechanism comprising, in combination:
   a housing;
   a bearing member within said housing providing a pair of substantially circular internal tracks;
   a pair of rollers adapted for travel about respective ones of said tracks, said rollers being connected to a commmon axle;
   an upstanding annular flange separating said tracks and providing a thrust shoulder for preventing sideways movement of said rollers because of thrust loads along said axle;
   a drive shaft for driving said rollers about said tracks to generate vibratory movement of said mechanism; and
   a rigid drive arm connecting said axle to said drive shaft, said arm including a bearing on one end thereof connecting said arm to said axle between said rollers to permit rotation of said axle with respect to said arm and to provide a balanced drive force for driving said rollers, said arm further including means for connecting said arm to said drive shaft in such a manner as to permit free movement of said arm along and transverse to said drive shaft while requiring said arm to rotate with said drive shaft, whereby said arm transmits rotational forces from said drive shaft to said rollers while isolating said drive shaft from radial and thrust loads on said rollers.

2. Apparatus in accordance with claim 1 wherein said arm has an elongated slot at substantially the center thereof, said drive shaft includes a portion which traverses said slot, said slot and said portion being dimensioned to allow free movement of said arm along and transverse to said drive shaft while requiring said arm to rotate with said drive shaft.

* * * * *